(12) United States Patent
Kim et al.

(10) Patent No.: US 12,222,798 B2
(45) Date of Patent: Feb. 11, 2025

(54) METHOD OF MANAGING SYSTEM HEALTH

(71) Applicant: ELECTRONICS AND TELECOMMUNICATIONS RESEARCH INSTITUTE, Daejeon (KR)

(72) Inventors: Nack Woo Kim, Daejeon (KR); Byung Tak Lee, Daejeon (KR); Jun Gi Lee, Daejeon (KR); Hyun Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 286 days.

(21) Appl. No.: 17/965,537

(22) Filed: Oct. 13, 2022

(65) Prior Publication Data
US 2023/0161653 A1 May 25, 2023

(30) Foreign Application Priority Data
Nov. 22, 2021 (KR) .......... 10-2021-0161460

(51) Int. Cl.
*G06F 11/00* (2006.01)
*G06F 18/2132* (2023.01)
*G06N 3/04* (2023.01)
*G06N 3/08* (2023.01)

(52) U.S. Cl.
CPC ........ *G06F 11/008* (2013.01); *G06F 18/2132* (2023.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 10,814,883 B1 * | 10/2020 | Dixit | B60W 50/02 |
| 10,964,130 B1 * | 3/2021 | Dixit | G05B 23/0283 |
| 2005/0222811 A1 * | 10/2005 | Jakobson | H04L 41/147 702/183 |
| 2005/0222895 A1 * | 10/2005 | Jakobson | G06Q 10/0635 705/7.11 |

(Continued)

FOREIGN PATENT DOCUMENTS

| | | |
|---|---|---|
| KR | 10-2212022 B1 | 2/2021 |
| KR | 10-2229638 B1 | 3/2021 |
| KR | 10-2021-0066730 A | 6/2021 |

*Primary Examiner* — Mujtaba M Chaudry
(74) *Attorney, Agent, or Firm* — Rabin & Berdo, P.C.

(57) ABSTRACT

A method of managing system health is provided. The method includes calculating a reconstruction missing value with respect to the second domain data, determining a degree of degradation of the system on the basis of the reconstruction missing value, predicting a second remaining useful life (RUL) prediction value ỹ of the system on the basis of the second domain data, based on a result of the determination of the degree of degradation, optimizing a degradation compensation function on the basis of a distribution of a first RUL prediction value y of the system predicted based on the first domain data in a pre-learning process of the diagnosis model, and predicting a final RUL prediction value ỹ' obtained by compensating for the second RUL prediction value ỹ, by using the optimized degradation compensation function.

10 Claims, 7 Drawing Sheets

(56) References Cited

U.S. PATENT DOCUMENTS

2012/0254936 A1    10/2012   Baek et al.
2014/0172497 A1    6/2014   Kim et al.
2023/0063601 A1*   3/2023   Upadhyay .............. G07C 5/006

* cited by examiner

METHOD OF MANAGING SYSTEM HEALTH

CROSS-REFERENCE TO RELATED APPLICATIONS

This application claims the benefit of the Korean Patent Application No. 10-2021-0161460 filed on Nov. 22, 2021, which is hereby incorporated by reference as if fully set forth herein.

BACKGROUND

Field of the Invention

The present invention relates to technology for managing system health, and more particularly, to technology for predicting a remaining useful life (RUL) of a system.

Discussion of the Related Art

RUL prediction technology may previously detect an abnormal situation of a system, and thus, is an important system health management technique for much reducing the accident processing cost and an accident handling time when an accident occurs due to a system breakdown.

In managing the health of a new system, because a system degradation does not immediately occur, a method is generally used where an anomaly diagnosis of the system is continuously performed and a RUL is predicted through overall system analysis when an excessive abnormal situation occurs.

Such a conventional system health management technique has the following problems.

First, in the conventional system health management technique, an anomaly diagnosis process of continuously performing an anomaly diagnosis of a system and a process of predicting an RUL up to an initial breakdown occurrence time of the system from a time at which an anomaly of the system is initially diagnosed are independently performed, and in this case, organic interpretation between pieces of diagnosis data obtained by each process is difficult, maintenance and repair such as a software (SW) update are difficult, and the allocation of more system resources is needed.

Second, it is difficult to obtain use data up to run-to-failure (RTF) data (i.e., data used up to a final breakdown from an initial system operation) of a corresponding system for predicting an RUL. The RTF data is essential for learning an overall operation pattern of the system, and thus, is necessarily needed.

For example, in association with the health management of a vehicular system, state data related to a bearing or an engine may be used as reference data for predicting an RUL of the vehicular system, but because the reference data is not actual system data needed for prediction of the RUL, it is difficult to directly use the reference data as data for prediction of the RUL.

Third, in a case which predicts an RUL of a system through an anomaly diagnosis, because threshold times and the degrees of degradation predicted based on two pieces of data (reference data and system data) differ, the accuracy of prediction of the RUL is reduced. Here, the threshold time is a time at which an anomaly of the system is initially diagnosed.

As described above, in the conventional system health management technique, because an RUL is predicted by processing various independent processes, the efficiency of system management is reduced, and a possibility that a problem occurs in association and matching between processes (or pieces of data) or system performance increases.

SUMMARY

An aspect of the present invention is directed to providing an apparatus including an RUL diagnosis model and a method thereof, which may collectively process various processes for diagnosing an anomaly and an RUL of a system on the basis of multi-domain data.

In the object of the present invention, in detail, in a multi-domain data environment, a single process of applying an unsupervised learning-based anomaly diagnosis technique to an RUL diagnosis model to calculate a threshold time for prediction of the RUL may be implemented, the capability to determine a domain of output data of a system may be minimized through feature vector extraction and post-processing of the same attribute between multi-domain data, and health prediction performance may increase by optimizing an inter-domain degradation function parameter in diagnosing the RUL.

To achieve these and other advantages and in accordance with the purpose of the invention, as embodied and broadly described herein, there is provided a method of managing health of a system by using a diagnosis model pre-learned based on multi-domain data including first and second domain data, the method including: calculating a reconstruction missing value with respect to the second domain data; determining a degree of degradation of the system on the basis of the reconstruction missing value; predicting a second remaining useful life (RUL) prediction value $\hat{y}$ of the system on the basis of the second domain data, based on a result of the determination of the degree of degradation; optimizing a degradation compensation function on the basis of a distribution of a first RUL prediction value y of the system predicted based on the first domain data in a pre-learning process of the diagnosis model; and predicting a final RUL prediction value $\hat{y}'$ obtained by compensating for the second RUL prediction value $\hat{y}$, by using the optimized degradation compensation function.

In an embodiment, the method further includes, before the calculating the reconstruction missing value, preprocessing the second domain data, wherein the preprocessing the second domain data includes: dividing a size of the second domain data into a batch size; and connecting the second domain data divided into the batch size.

In an embodiment, the diagnosis model includes an encoder network and a decoder network connected to an output of the encoder network, and the calculating the reconstruction missing value includes: extracting a dimensionality-reduced second latent variable from the second domain data by using the encoder network; reconstructing the second latent variable to have the same data dimensionality as a data dimensionality of the second domain data by using the decoder network; and calculating the reconstruction missing value representing a difference between the second domain data and output data reconstructed from the second latent variable by using the decoder network.

In an embodiment, the encoder network is a neural network pre-learned not to classify the first and second domain data into different domains, and the extracting the dimensionality-reduced second latent variable includes extracting the second latent variable, including a common characteristic of the first and second domain data, from the second domain data by using the pre-learned encoder network.

In an embodiment, the determining the degree of degradation of the system includes: extracting an anomaly index on the basis of the reconstruction missing value; comparing the anomaly index with a first threshold value to determine the occurrence or not of anomaly of the system; and when it is determined that the anomaly of the system occurs, comparing a second threshold value with a ratio of the number of anomaly notification samples to the number of normalcy notification samples to determine the occurrence or not of anomaly associated with the degree of degradation of the system.

In an embodiment, the diagnosis model includes an encoder network configured to extract a dimensionality-reduced second latent variable from the second domain data and a decoder network configured to reconstruct the second latent variable, and the number of normalcy notification samples is the number of output values recognized as normalcy among output values of the decoder network, and the number of anomaly notification samples is the number of output values recognized as anomaly among the output values of the decoder network.

In an embodiment, the anomaly is a value obtained by normalizing the reconstruction missing value.

In an embodiment, the anomaly index is a representative value representing a maximum value, a minimum value, or an average value of the reconstruction missing value.

In an embodiment, the optimizing the degradation compensation function includes mapping a second degradation model, representing a distribution of the second RUL prediction value $\tilde{y}$, to a first degradation model representing a distribution of the first RUL prediction value y.

In an embodiment, the predicting the final RUL prediction value $\tilde{y}'$ includes: calculating a first threshold time by using a first degradation model function representing a distribution of the first RUL prediction value y; calculating a second threshold time by using a second degradation model function representing a distribution of the second RUL prediction value $\tilde{y}$; mapping the second threshold time to the first threshold time by using a difference time between the first threshold time and the second threshold time; and outputting a compensated second RUL prediction value $\tilde{y}'$ on the basis of the second threshold time mapped to the first threshold time.

In another aspect of the present invention, there is provided an apparatus for managing system health including: a processor and a storage device configured to store the diagnosis model executed by the processor, wherein the diagnosis model includes: an encoder network configured to extract a second feature vector from second domain data; a decoder network connected to the encoder network and configured to predict a degree of degradation of the system by using data reconstructed from the second feature vector; and a regression network connected to the encoder network and configured to start a remaining useful life (RUL) prediction process on the basis of a result of predicting the degree of degradation of the system, and the regression network predicts a final RUL prediction value $\tilde{y}'$ by using a first RUL prediction value y of the system predicted based on a first feature vector extracted from the first domain data in a pre-learning process and a second RUL prediction value $\tilde{y}$ of the system predicted based on the second feature vector.

In an embodiment, the diagnosis model further includes a domain discrimination network connected to the encoder network, and the domain discrimination network is implemented as an adversarial neural network pre-learned not to classify the first and second domain data into different domains.

In an embodiment, the decoder network predicts a degree of degradation of the system on the basis of a reconstruction missing value representing a difference between the second domain data and the reconstructed data.

In an embodiment, the decoder network normalizes the reconstruction missing value or determines the occurrence or not of anomaly of the system on the basis of an anomaly index representing a maximum value, a minimum value, or an average value of the reconstruction missing value, and when anomaly of the system is determined, predicts the degree of degradation of the system on the basis of a ratio of the number of anomaly notification samples to the number of normalcy notification samples, and the number of normalcy notification samples is the number of output values recognized as normalcy among output values of the decoder network, and the number of anomaly notification samples is the number of output values recognized as anomaly among the output values of the decoder network.

In an embodiment, when a ratio of the number of anomaly notification samples to the number of normalcy notification samples is greater than a threshold value, the regression network starts the RUL prediction process for calculating the final RUL prediction value $\tilde{y}'$ on the basis of a result of the prediction of the degree of degradation of the system.

In an embodiment, the regression network compensates for the second RUL prediction value $\tilde{y}$ by using a degradation compensation function of mapping a distribution of the second RUL prediction value $\tilde{y}$ to a distribution of the first RUL prediction value y and predicts the final RUL prediction value $\tilde{y}'$, obtained by compensating for the second RUL prediction value $\tilde{y}$, as an RUL of the system.

It is to be understood that both the foregoing general description and the following detailed description of the present invention are exemplary and explanatory and are intended to provide further explanation of the invention as claimed.

DETAILED DESCRIPTION OF THE INVENTION

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Figure 1:
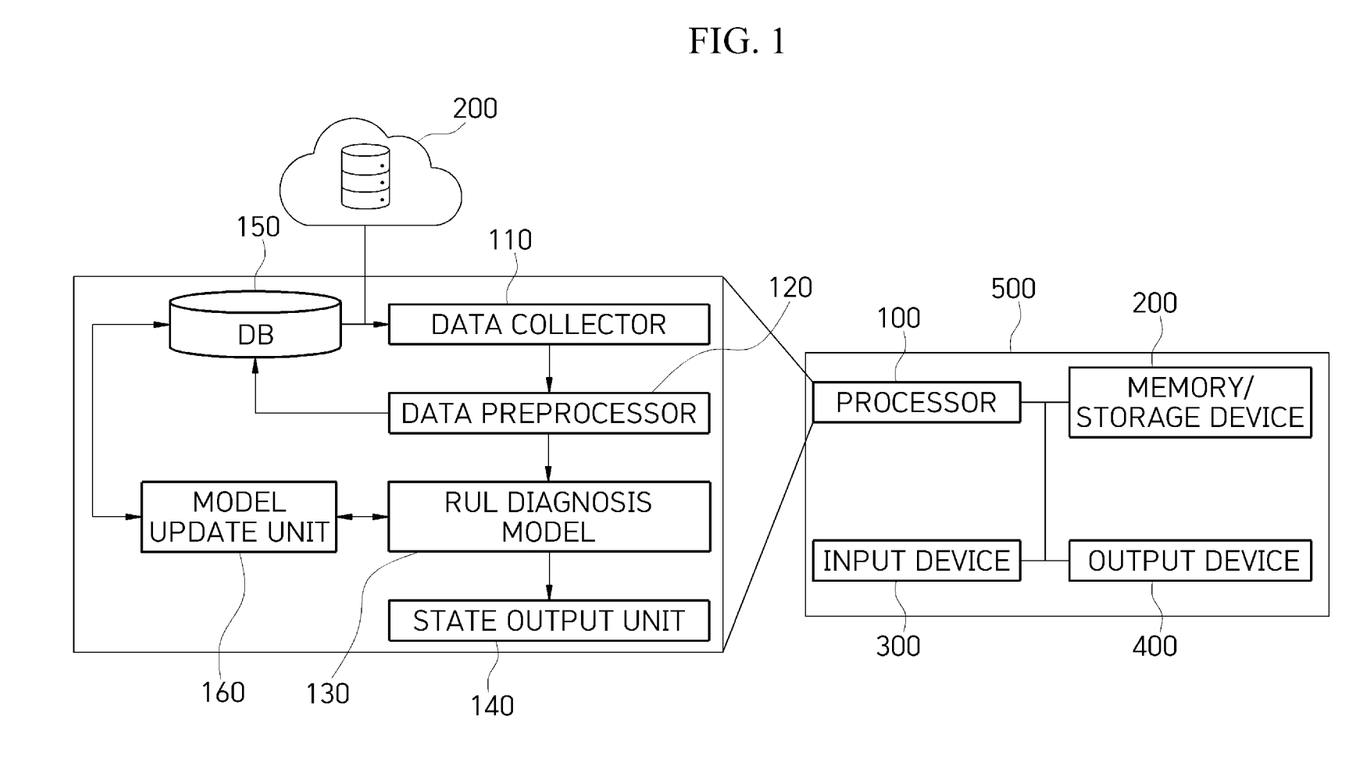
FIG. 1 is a block diagram schematically illustrating an internal configuration of an apparatus for managing the health of a system according to an embodiment of the present invention.

FIG. 1 is a block diagram schematically illustrating an internal configuration of an apparatus (system) 500 for managing the health of a system according to an embodiment of the present invention.

Referring to FIG. 1, in the apparatus 500 for managing the health of the system according to an embodiment of the present invention, a decoder network may be added to a neural network for predicting a remaining useful life (RUL) of the system, and an anomaly diagnosis and an RUL diagnosis of the system may be collectively performed based on a loss value between multi-domain data corresponding to original data and data reconstructed from the multi-domain data, for health management of a specific system.

To this end, the apparatus 500 for managing the health of the system according to an embodiment of the present invention may be a computing device configured to include a processor 100, a memory (or storage device) 200, an input device 300, and an output device 400.

The processor 100 may be a device including at least one central processing unit (CPU) and/or at least one graphics processing unit (GPU), which control(s) and manage(s) an operation of the apparatus 500 for managing the health of the system according to an embodiment of the present invention.

The processor 100 may execute or control a plurality of software modules for managing the health of the system. Here, the plurality of software modules may include a data collector 110, a data preprocessor 120, an RUL diagnosis model 130, a state output unit 140, a database (DB) 150, and a model update unit 160.

The storage device 200 including a memory may temporarily or permanently store intermediate data and/or resultant data processed by the processor 100, or may temporarily or permanently store intermediate data and/or resultant data processed by the plurality of software modules executed by the processor 100.

The storage device 200 including the memory may provide an execution space of each of the plurality of software modules and may temporarily or permanently store an algorithm, a program code, and an instruction for executing the plurality of software modules. The storage device 200 may include, for example, a volatile memory, a non-volatile memory, and a hard disk.

The input device 300 may be a device which transfers a user input to the processor 100 and may be a display device including a key input device or a key input function.

The output device 400 may be a device for outputting intermediate data and/or resultant data processed by the plurality of software modules or the processor 100, and for example, may be a display device including a display function.

Hereinafter, software modules executed by the processor 100 will be described.

The data collector 110 may collect multi-domain data from the database 150 stored in the storage device 200 and may provide the collected multi-domain data to the data preprocessor 120.

For example, the data collector 110 may periodically generate a query on the basis of a user input received through the input device 300 and may collect the multi-domain data from the database 150 by using the periodically generated query.

In another embodiment, the data collector 110 may aperiodically generate the query, namely, may generate a specific query at a specific time, and may collect the multi-domain data from the database 150 by using the specific query.

In another embodiment, the data collector 110 may collect the multi-domain data from a cloud database 150 by using a query generated at an arbitrary time.

The data preprocessor 120 may preprocess the multi-domain data input from the data collector 110, input the preprocessed multi-domain data to the RUL diagnosis model 130, and store the preprocessed multi-domain data in the database 150 again.

In an embodiment, preprocessing of the multi-domain data may be a process of cleansing the multi-domain data. Data cleansing may be process of removing, filling, or interpolating a missing value and/or an outlier associated with the multi-domain data, or a process of replacing the missing value and/or the outlier with another value.

In another embodiment, preprocessing of the multi-domain data may be a process of normalizing the multi-domain data.

In another embodiment, preprocessing of the multi-domain data may include a process of dividing each domain data constituting the multi-domain data on the basis of a batch size and/or a process of connecting pieces of domain data divided based on the batch size.

The RUL diagnosis model 130 may be an artificial neural network learned based on a learning algorithm executed by the processor 100 and may collectively process an anomaly diagnosis process, a health diagnosis process, an RUL prediction process, and a domain matching process to provide a processing result of each processor to the state output unit 140.

The state output unit 140 may convert the processing result, provided from the RUL diagnosis model 130, into visual information and may output the visual information to the output device 400. In this case, the output device 400 may be a display device which displays the visual information.

The model update unit 160 may store the RUL diagnosis model 130, having different versions based on an update time or the number of updates (a learning time or the number of learnings), in the storage device 200 and may read a specific version (for example, the RUL diagnosis model 130 updated recently).

Figure 2:
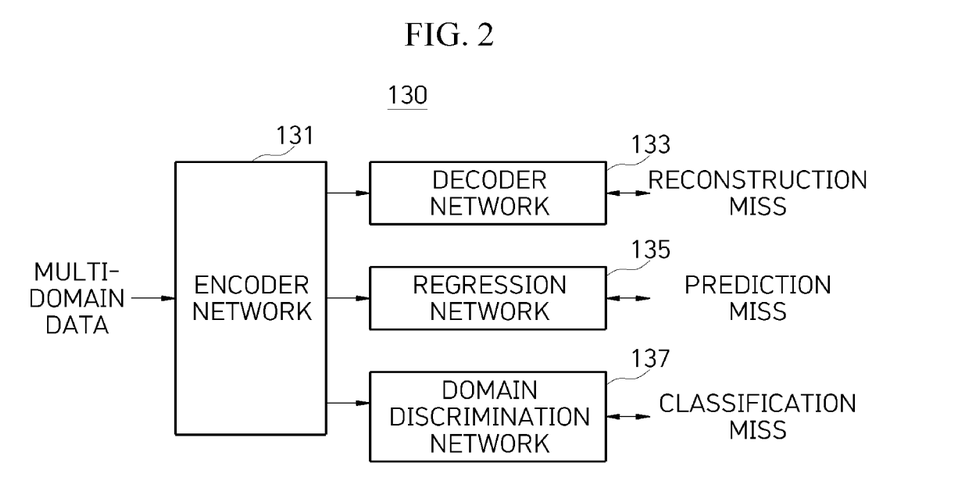
FIG. 2 is a block diagram schematically illustrating a configuration of an RUL diagnosis model illustrated in FIG. 1.

FIG. 2 is a block diagram schematically illustrating a configuration of the RUL diagnosis model illustrated in FIG. 1.

Referring to FIG. 2, the present invention may add a decoder network 133 to the inside of the RUL diagnosis model 130 and may perform system health management based on a batch process which collectively processes an anomaly diagnosis and an RUL diagnosis based on a reconstruction missing value.

Moreover, the present invention may collectively process an anomaly diagnosis process through the decoder network, a multi-domain data matching process though a domain discrimination network, and an RUL prediction process through a regression network, in order to diagnose an anomaly of a system and predict an RUL of the system in an environment where multi-domain data is provided.

To this end, the RUL diagnosis model 130 according to an embodiment of the present invention may include an encoder network 131, a decoder network 133, a regression network 135, and a domain discrimination network 137.

Before describing the elements 131, 133, 135, and 137, multi-domain data described herein may denote all kinds of data which are collected under operation conditions and operation test environments of different systems.

For example, in a wind power plant system, multi-domain data may include operation condition data and operation sensing data obtained in a wind power plant A and operation condition data and operation sensing data obtained in a wind power plant B.

In a sunlight power plant, multi-domain data may include operation condition data and operation sensing data obtained in a sunlight power plant A and operation condition data and operation sensing data obtained in a sunlight power plant B.

In home appliances, multi-domain data may include operation condition data and operation sensing data obtained in a home appliance A and operation condition data and operation sensing data obtained in a home appliance B.

Encoder Network 131

The encoder network 131 may be an artificial neural network which encodes multi-domain data collected from the database 150 or the cloud database 200 to reduce a dimensionality of the multi-domain data.

The encoder network 131 may reduce a dimensionality of the multi-domain data to generate a dimensionality-reduced feature vector. The feature vector may be a vector value which represents an intrinsic characteristic of each domain data, included in the multi-domain data, in a vector space and may be referred to as a 'latent variable'. Unless specially described, a 'feature vector' and a 'latent variable' may be regarded as the term herein.

In order to extract a feature vector (or a latent variable) from each domain data, the encoder network 131 may be implemented as, for example, a deep neural network (DNN), a convolutional neural network (CNN)), a recurrent neural network (RNN), or a combination thereof.

Decoder Network 133

The decoder network 133 may be an artificial neural network which decodes output data (a feature vector or a latent variable) of the encoder network 131 to reconstruct output data (a feature vector or a latent variable) having the same data dimensionality as the multi-domain data which is input data.

A neural network connecting the encoder network 131 to the decoder network 133 may be referred to as an autoencoder. In order to construct such an autoencoder, the decoder network may be implemented as, for example, a DNN, a CNN, an RNN, or a combination thereof.

Regression Network 135

The regression network 135 may be an artificial neural network which predicts an RUL of a system by using output data (a latent variable) of the encoder network 131 as an input.

In order to predict the RUL of the system, the regression network 135 may be implemented as, for example, a DNN, a CNN, an RNN, or a combination thereof.

Domain Discrimination Network 137

The domain discrimination network 137 may be an artificial neural network which matches output data (a feature vector or a latent variable) of the encoder network 131. The multi-domain data may be matched through matching of the output data.

For matching of the multi-domain data, the domain discrimination network 137 may be implemented as, for example, an adversarial neural network such as a domain-adversarial neural network (DANN) or a generative adversarial network (GAN).

Figure 3:
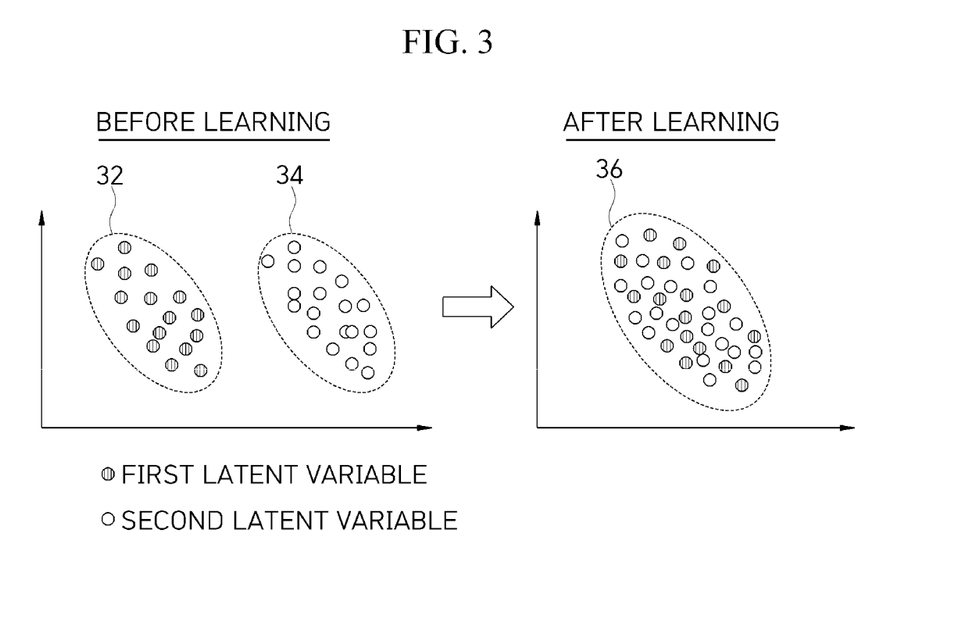
FIG. 3 is a diagram for describing a classification result of latent variables classified before learning and a classification result of latent variables classified after learning by using a domain discrimination network illustrated in FIG. 2.

FIG. 3 is a diagram for describing a classification result of latent variables classified before learning and a classification result of latent variables classified after learning by using a domain discrimination network illustrated in FIG. 2.

When it is assumed that multi-domain data includes a first domain data corresponding to a first domain and a second domain data corresponding to a second domain which differs from the first domain, as illustrated in a left region of FIG. 3, a before-learning domain discrimination network 137 may classify first latent variables (or first feature vectors), extracted from the first domain data by the encoder network 131, into a first domain region 32 and may classify second latent variables (or second feature vectors), extracted from the second domain data by the encoder network 131, into a second domain region 32 which is clearly differentiated from the first domain region 32.

On the other hand, as illustrated in a right region of FIG. 3, an after-learning domain discrimination network 137 may classify the first latent variables extracted from the first domain data and the second latent variables extracted from the second domain data so as to be distributed in one domain region 36.

That is, the domain discrimination network 137 learned according to an embodiment of the present invention may be learned to regard as a multi-domain as one same domain and may be classified not to clearly differentiate the first latent variables and the second latent variables.

When the first domain data includes right answer data (label) and the second domain data does not include the right answer data, the domain discrimination network 137 learned to regard a multi-domain as one same domain may predict the second domain data including no right answer data on the basis of the first domain data including the right answer data.

Figure 4:
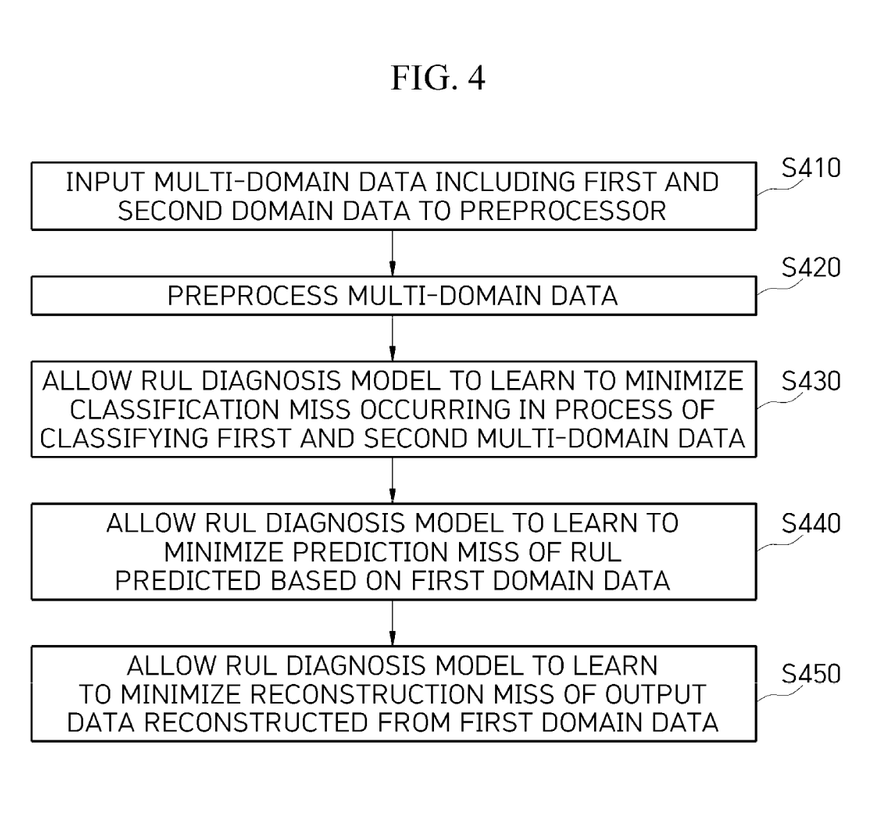
FIG. 4 is a flowchart illustrating a learning method of the RUL diagnosis model illustrated in FIGS. 1 and 2.

FIG. 4 is a flowchart illustrating a learning method of the RUL diagnosis model illustrated in FIGS. 1 and 2.

Learning of the RUL diagnosis model 130 described below is limited to being performed in an environment which provides multi-domain data including first and second domain data associated with two different domains. However, this is merely for helping understand description and may not intend to limit a situation where the RUL diagnosis model 130 according to the present invention is learned in an environment which provides two pieces of domain data. Therefore, the learning method of the RUL diagnosis model according to the present invention may be applied even in an environment which provides multi-domain data including three pieces of domain data associated with three or more different domains.

Referring to FIG. 4, first, in step S410, the data collector 110 may collect multi-domain data from the database 150 or the cloud database 200 and may input the collected multi-domain data to the preprocessor 120. Here, a first domain data may include right answer data (label), and a second domain data may not include the right answer data.

Subsequently, in step S420, the preprocessor 120 may preprocess the multi-domain data. In an embodiment, preprocessing may include a processing process of dividing the multi-domain data based on a predetermined batch size and/or a processing process of connecting pieces of multi-domain data divided based on the batch size.

Subsequently, in step S430, in order for the encoder network 131 and the domain discrimination network 137 to process a domain matching process, the RUL diagnosis model 130 may be learned to minimize classification miss (a classification missing value) occurring in a process of classifying the preprocessed multi-domain data (i.e., the preprocessed first and second domain data) by using a processor (100 of FIG. 1).

In an embodiment, the encoder network 131 may extract a first latent variable of the preprocessed first domain data and a second latent variable of the preprocessed second domain data. Subsequently, the processor (100 of FIG. 1) may learn parameters (or weights) of the encoder network 131 and the domain discrimination network 137 so that the domain discrimination network 137 does not classify the first latent variable and the second latent variable into different domains.

The domain discrimination network 137 may be implemented as an adversarial neural network, and thus, even when learning is performed to minimize classification miss, the domain discrimination network 137 may be learned not to the first and second latent variables into different domains.

To this end, a classifier, a domain discriminator, and a gradient reversal layer connecting the domain discriminator to the gradient reversal layer may be additionally provided in the domain discrimination network 137, and weight learning in a neural network may be performed based on backpropagation from an output terminal to an input terminal.

Subsequently, in step S440, in order for the encoder network 131 and the regression network 135 to process an RUL prediction process, the RUL diagnosis model 130 may be learned so that the processor (100 of FIG. 1) minimizes RUL prediction miss (or a prediction missing value) predicted based on the preprocessed first domain data.

In an embodiment, the encoder network 131 may extract the first latent variable of the preprocessed first domain data including the right answer data. Subsequently, the regression network 135 may output RUL prediction data predicted based on the extracted first latent variable. Subsequently, the processor (100 of FIG. 1) may learn the parameters (or weights) of the encoder network 131 and the domain discrimination network 137 to minimize prediction miss representing a difference between the RUL data and the right answer data.

Subsequently, in step S450, in order for the encoder network 131 and the decoder network 133 to process a reconstruction process of the first domain data, the processor (100 of FIG. 1) may allow the decoder network 133 to learn so that reconstruction miss (or a reconstruction missing value) between the preprocessed first domain data (or second domain data) input to the encoder network 131 and reconstruction data output from the decoder network 133 is minimized.

In an embodiment, the encoder network 131 may extract a dimensionality-reduced first latent variable from the preprocessed first domain data. Subsequently, the decoder 133 may output reconstructed data obtained by reconstructing the first latent variable to have the same dimensionality as that of the first domain data. Subsequently, the processor (100 of FIG. 1) may learn a parameter of the decoder network 133 to minimize reconstruction miss representing a difference between the first domain data and the reconstructed data.

Here, in a learning process (S450) for performing the reconstruction process, the parameter of the encoder network 131 may not be learned, and only the parameter of the decoder network 133 may be learned. That is, only a model parameter of the decoder network 133 may be learned in a state where a model parameter of the encoder network 131 is fixed not to be learned. This may be for not affecting a learning result of each of the domain discrimination network 137 and the regression network 135.

Figure 5:
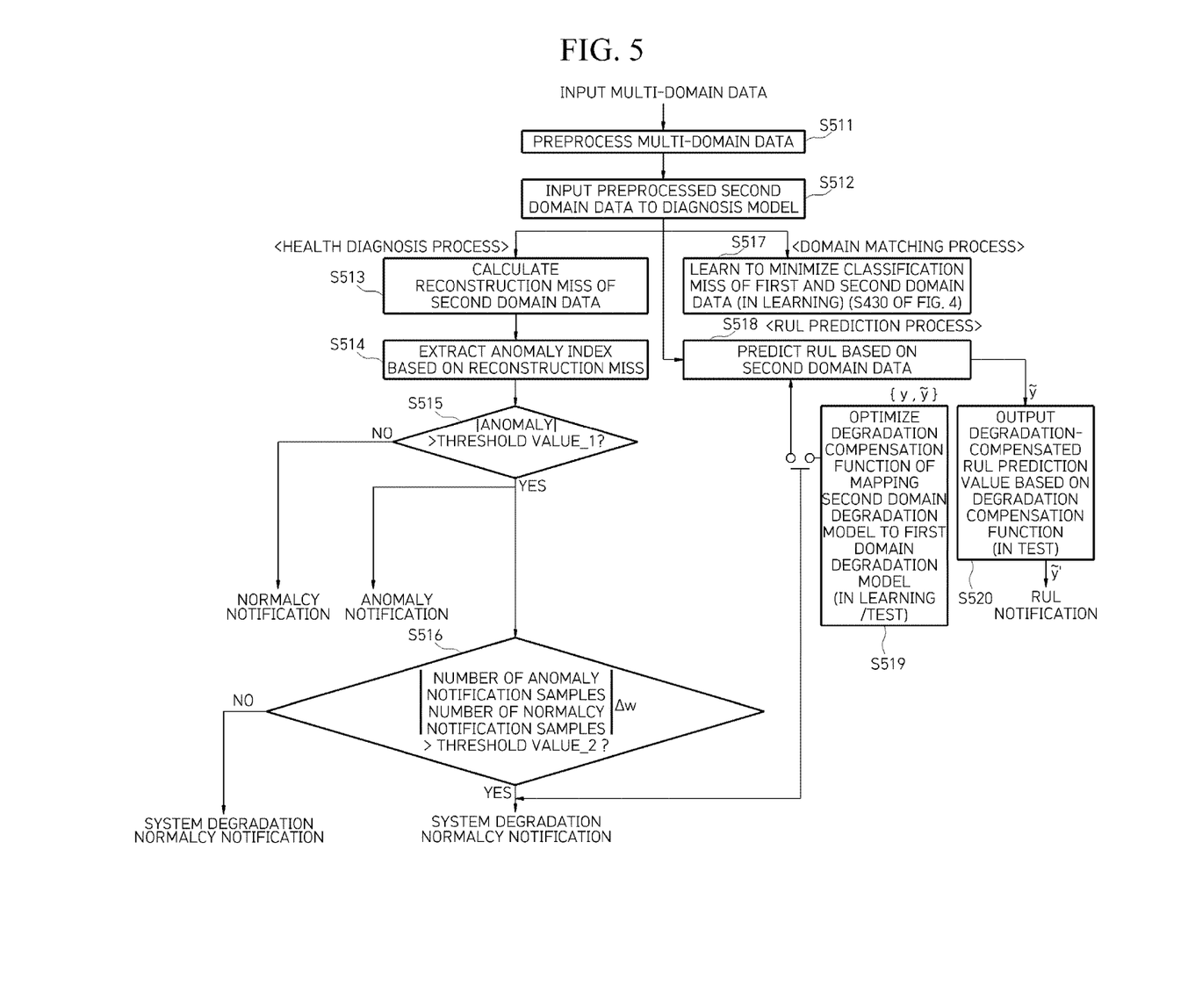
FIG. 5 is a flowchart for describing a health management method performed in a test process of an RUL diagnosis model learned based on a learning process of FIG. 4.
Figure 6:
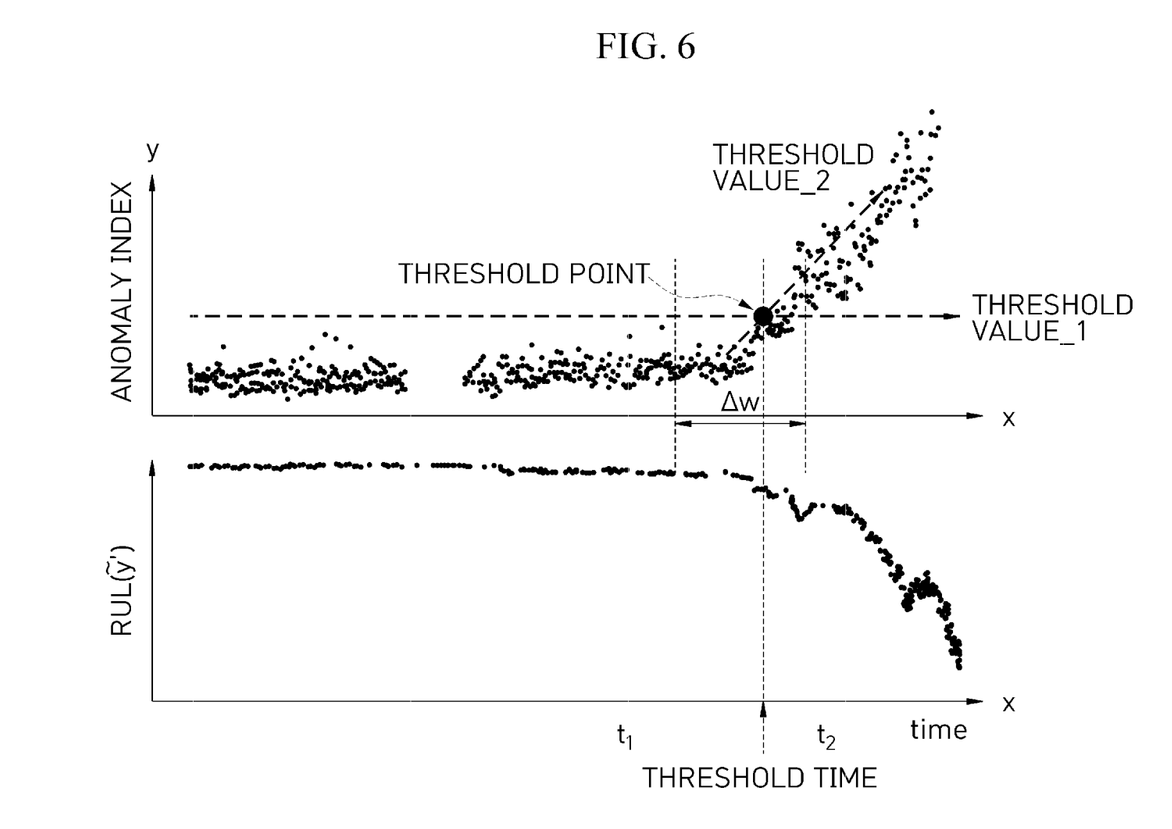
FIG. 6 is a diagram for describing a diagnosis method corresponding to a threshold time of an RUL and an abnormal state of a system according to an embodiment of the present invention.
Figure 7:
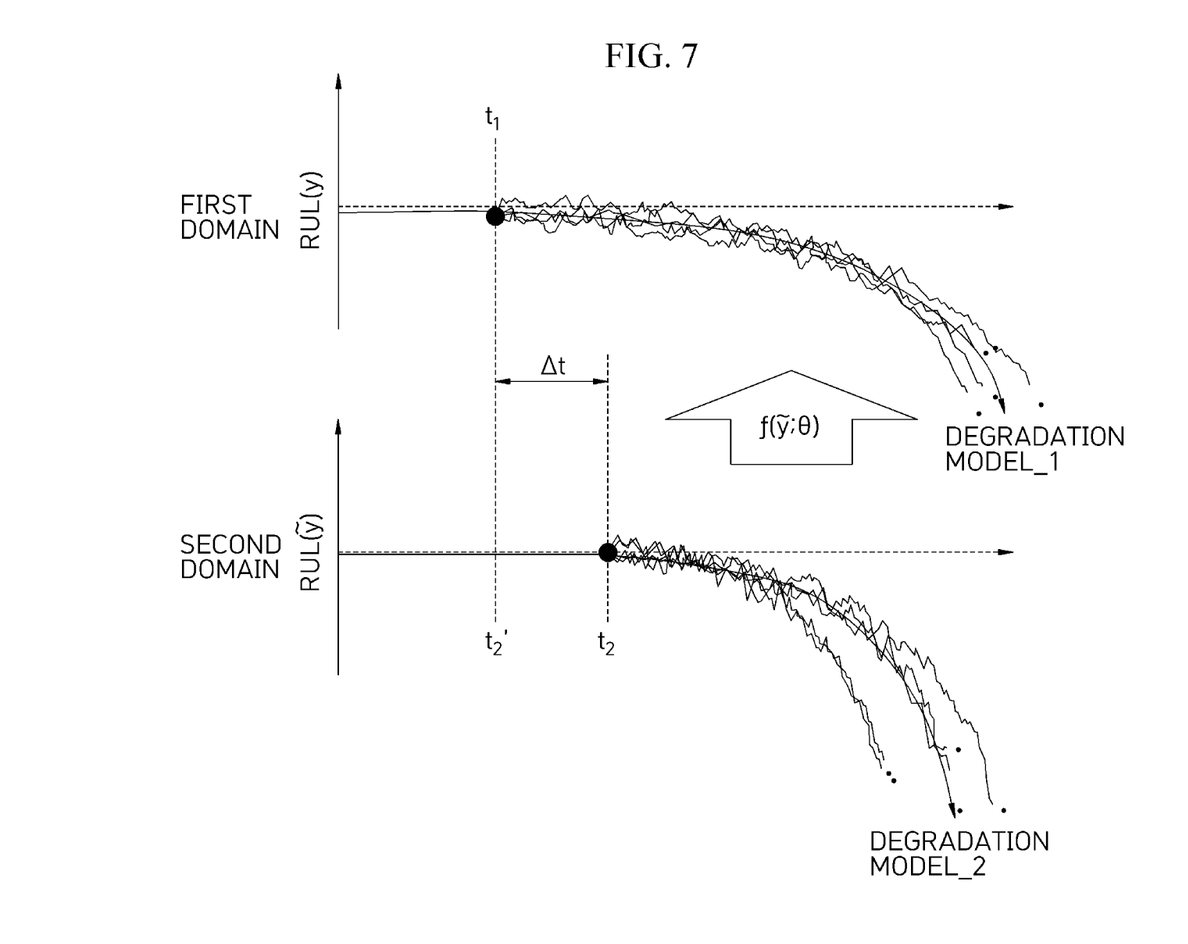
FIG. 7 is a diagram for describing a degradation compensation method and matching of an RUL threshold time according to an embodiment of the present invention.
Figure 8:
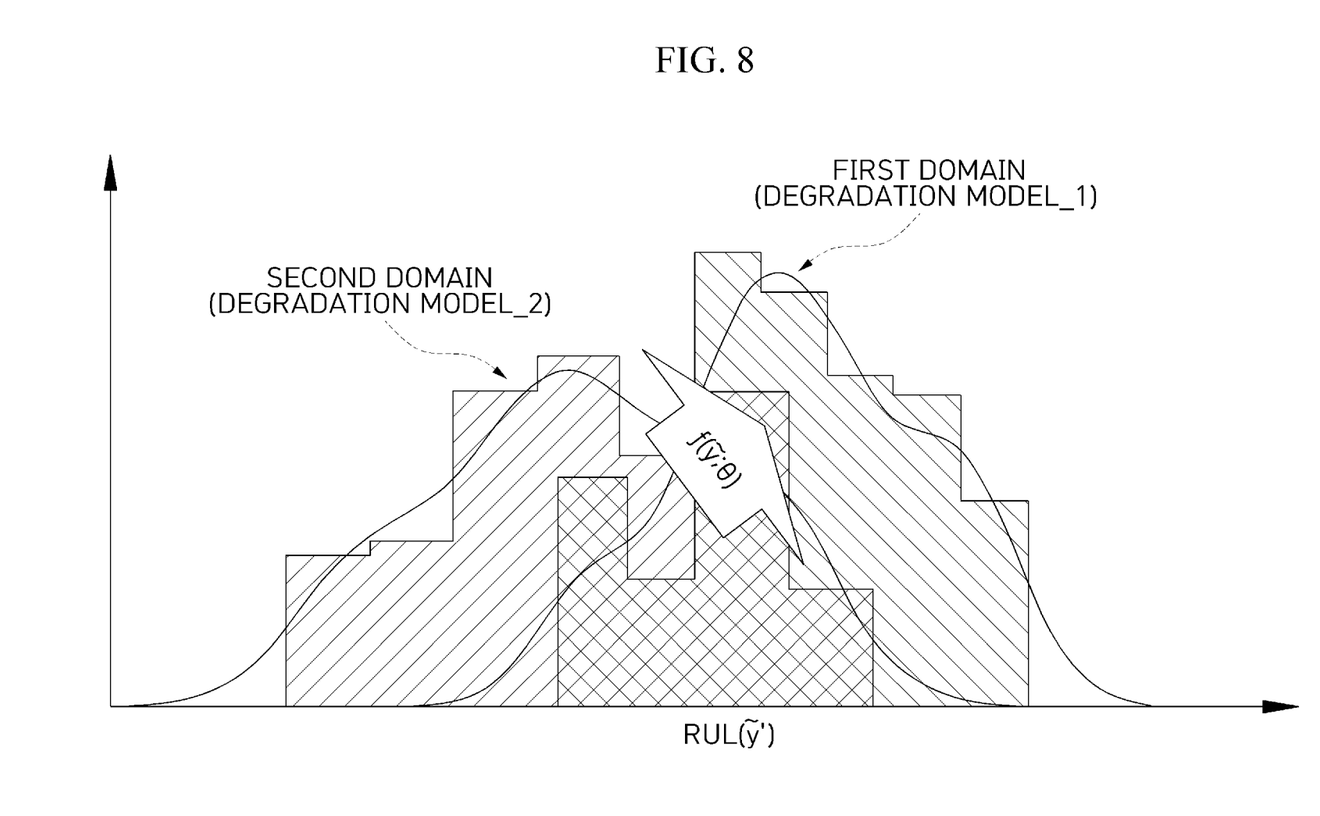
FIG. 8 is a diagram for describing a degradation compensation function $f(\tilde{y}; \theta)$ according to an embodiment of the present invention.

FIG. 5 is a flowchart for describing a health management method performed in a test process of an RUL diagnosis model learned based on a learning process of FIG. 4, and FIGS. 6 to 8 are diagrams for describing the RUL prediction processes (S518 to S520) illustrated in FIG. 5. FIG. 6 is a diagram for describing a diagnosis method corresponding to a threshold time of an RUL and an abnormal state of a system according to an embodiment of the present invention. FIG. 7 is a diagram for describing a degradation compensation method and matching of an RUL threshold time according to an embodiment of the present invention. FIG. 8 is a diagram for describing a degradation compensation function $f(\tilde{y}; \theta)$ according to an embodiment of the present invention.

Referring to FIG. 5, a health management method performed in a test process of the RUL diagnosis model 130 according to an embodiment of the present invention is limited to using a learned RUL diagnosis model according to the embodiment of FIG. 4 described above. Therefore, multi-domain data used in the test process of the RUL diagnosis model 130 according to an embodiment of the present invention may include first domain data including right answer data (right answer label) and second domain data including no right answer data (right answer label).

A main element for performing steps described below may be the processor 100 illustrated in FIG. 1, or may be a neural network connecting the encoder network 131 and the decoder network 133 executed by the processor 100, a neural network connecting the encoder network 131 and the regression network 135, or a neural network connecting the encoder network 131 and the domain discrimination network 137.

First, in step S511, a process of preprocessing multi-domain data may be performed. For example, preprocessing may include a processing process of dividing the multi-domain data based on a predetermined batch size and/or a processing process of connecting pieces of multi-domain data divided based on the batch size.

Subsequently, in step S512, in order to perform a test of the RUL diagnosis model 130, preprocessed second domain data including no right answer data (right answer label) may be input to the RUL diagnosis model 130 learned based on the learning method of FIG. 4. Accordingly, the RUL diagnosis model 130 may start a health diagnosis process, a domain matching process, and an RUL prediction process, based on the preprocessed second domain data including no right answer data (right answer label).

Furthermore, the domain matching process may be performed by the domain discrimination network 137 which is learned to be difficult to differentiate first domain data from second domain data. As described above, because the domain discrimination network 137 is implemented as an adversarial neural network, even when learning is performed to minimize classification miss, reverse weight learning may be performed not to differentiate pieces of multi-domain input data. Through such a learning process, the learning-completed encoder network 131 may output a latent variable which is configured to include a common characteristic of the first domain data and the second domain data.

Subsequently, in steps S513 to S516, a health diagnosis process may be performed.

First, in step S513, a process of calculating reconstruction miss (a reconstruction missing value) of the second domain data may be performed.

In order to calculate the reconstruction miss (the reconstruction missing value), the encoder network 131 pre-learned through the learning process of FIG. 4 may extract a second latent variable from the second domain data, and the decoder network 133 pre-learned through the learning process of FIG. 4 may output reconstructed data obtained by reconstructing the second latent variable. Subsequently, the pre-learned decoder network 133 or the processor 100 may calculate the reconstruction miss (the reconstruction missing value) representing a difference between the second domain data and the reconstructed data.

The decoder network 133 pre-learned based on the first domain data through the learning process of FIG. 4 may perform a reconstruction process on the second domain data (or the second latent variable) due to the encoder network 131 pre-learned to perform a domain matching process.

Subsequently, in step S514, a process of extracting an anomaly index of a second domain corresponding to the second domain data may be performed based on the calculated reconstruction miss (reconstruction missing value).

In an embodiment, the anomaly index may be a value obtained by normalizing reconstruction missing values.

In an embodiment, the anomaly index may be a representative value such as a maximum value, a minimum value, or an average value of reconstruction missing values selected within a certain period.

In an embodiment, the anomaly index may be a distance value from a center of a normal cluster obtained by clustering the reconstruction missing values.

In an embodiment, the anomaly index may be a distance value from an outermost portion of the normal cluster.

Subsequently, in step S515, when an anomaly index (or an absolute value of an anomaly index) which is an output value of the decoder network 133 is greater than a 'threshold value_1', the decoder network 133 or the processor 100 may generate 'anomaly notification' corresponding to a corresponding output value, and when the anomaly index (or the absolute value of the anomaly index) is less than or equal to the 'threshold value_1', the decoder network 133 or the processor 100 may generate 'normalcy notification' corresponding to a corresponding output value.

Subsequently, in step S516, when a ratio of the number of anomaly notification samples to the number of normalcy notification samples occurring within a certain time interval $\Delta\omega$ is greater than a 'threshold value_2', the decoder network 133 or the processor 100 may generate 'system degradation anomaly notification', and RUL processes (S518 to S520) may be performed. On the other hand, when a ratio of the number of anomaly notification samples to the number of normalcy notification samples is less than or equal to the 'threshold value_2', the decoder network 133 or the processor 100 may generate 'system degradation normalcy notification'. Here, a ratio of the number of anomaly notification samples to the number of normalcy notification samples may be an absolute value obtained by dividing the number of anomaly notification samples by the number of normalcy notification samples. The number of normalcy notification samples may be the number of output values of the decoder network 133 recognized as a normalcy value through a process (S515), and the number of anomaly notification samples may be the number of output values of the decoder network 133 recognized as an anomaly value through a process (S515).

Steps S515 and S516 will be described below in more detail with reference to FIG. 6.

As illustrated in FIG. 6, when an absolute value of an anomaly index is greater than a 'threshold value_1', the RUL diagnosis model 130 or the decoder network 33 executed by a processor (100 of FIG. 1) may generate 'anomaly notification'.

When a ratio of the number of output samples, which are greater than the 'threshold value_1' and are recognized as an anomaly value, to the number of output samples recognized as a normalcy value within a predetermined certain time interval $\Delta w$ is greater than a 'threshold value_2', 'system degradation anomaly notification' may occur. At this time, a manager of a system may adjust a frequency number of occurrence of 'anomaly notification' or 'system degradation anomaly notification' and may adjust the 'threshold value_1' or the 'threshold value_2', and when it is checked that the number of accumulations of 'anomaly notification' or 'system degradation anomaly notification' is greater than or equal to a reference number of times, the occurrence of notification may be controlled so that notification occurs.

In the present invention, the 'threshold value_2' may represent the number of anomaly notification samples with respect to the number of normalcy notification samples within $\Delta w$, and thus, may be expressed as a slope value in a function (an anomaly index function) representing an anomaly index.

In the present invention, a time at which 'system degradation anomaly notification' starts may be referred as a 'threshold time' in an x axis representing a time, and a time at which 'system degradation anomaly notification' starts may be referred as a threshold point in a y axis representing an 'anomaly index'.

Hereinafter, a processing process of RUL processes (S518 to S520) will be described in more detail with reference to FIGS. 7 and 8.

First, in step S518, the regression network 135 may primarily predict an RUL prediction value $\hat{y}$ of a system on the basis of second domain data.

Subsequently, in step S519, a process of optimizing a degradation compensation function $f(\hat{y}; \theta)$ of mapping a degradation model of a second domain corresponding to the second domain data to a degradation model of a first domain corresponding to first domain data may be performed. Here, the degradation compensation function $f(\hat{y}; \theta)$ may be a compensation function of approximating $\hat{y}$ to y, wherein y may be a right answer value included in the first domain data or an RUL prediction value predicted based on the first domain data. Also, the process of optimizing the degradation compensation function $f(\hat{y}; \theta)$ may be a process of learning a parameter $\theta$.

Subsequently, in step S520, the regression network 135 may compensate for the RUL prediction value ŷ on the basis of the degradation compensation function $f(ŷ; \theta)$ which is optimized (or learned) in step S519 and may output the compensated RUL prediction value ŷ. The optimized (or learned) degradation compensation function $f(ŷ; \theta)$ may finally output a degradation-compensated prediction value ŷ' with respect to an input ŷ.

Based on the learning method of FIG. 4 described above, the regression network 135 may be learned to minimize prediction miss by using the first domain data as an input, and the learned regression network 135 may be connected to the encoder network 131 which is learned to perform a domain matching process and may output the RUL prediction value ŷ based on the second domain data.

Furthermore, although the encoder network 131 is learned to perform the domain matching process, a distribution of a first latent variable extracted from the first domain data used in a learning process of the encoder network 131 may not completely be equal to a distribution of a second latent variable extracted from the second domain data used in a real test process.

As described above, when the distribution of the first latent variable is not completely be equal to the distribution of the second latent variable, as illustrated in FIG. 7, a degradation model_1 representing a distribution of an RUL prediction value predicted based on the first latent variable by the regression network 135 may not completely be equal to a degradation model_2 representing a distribution of an RUL prediction value predicted based on the first latent variable. This may denote that a threshold point between multi-domains may differ from a degradation model function representing a degradation model and may denote that an RUL prediction error may occur.

In order to decrease the RUL prediction error, in the present invention, a first threshold time $t_1$ may be calculated in a degradation model function (or an RUL prediction function) representing a degradation model_1 predicted based on the first domain data and a second threshold time $t_2$ may be calculated in a degradation model function (or an RUL prediction function) representing a degradation model_2 predicted based on the second domain data, and then, by using a difference time $\Delta t$ between the first threshold time $t_1$ and the second threshold time $t_2$, the second threshold time $t_2$ of the degradation model_2 may be mapped to the first threshold time $t_1$ of the degradation model_1. Subsequently, an RUL prediction process may be performed from a second threshold time $t_2'$ mapped to the first threshold time $t_1$ of the degradation model_1. Accordingly, an RUL prediction error based on a distribution difference (or a threshold time difference) of an RUL prediction value between multi-domains may be considerably reduced.

Moreover, in order to more increase the accuracy of RUL prediction, an RUL prediction value may be corrected based on the degradation compensation function $f(ŷ; \theta)$. In this case, the degradation compensation function $f(ŷ; \theta)$ may be a function which has ŷ (an RUL prediction value based on the second domain data) as an input and has y (a right answer value of the first domain data) as an output and may be calculated by optimizing the parameter $\theta$.

That is, the RUL prediction value ŷ primarily predicted through the degradation compensation function $f(ŷ; \theta)$ may be corrected to the degradation-compensated prediction value ŷ'. Accordingly, an RUL prediction error caused by a domain variation may be considerably reduced.

The degradation compensation function $f(ŷ; \theta)$, as illustrated in FIG. 8, may be used to match and compensate for a degradation model_1 representing a distribution of an RUL prediction value predicted based on the first domain data in a learning process of the diagnosis model 130 and a degradation model_2 representing a distribution of an RUL prediction value predicted based on the second domain data in a test process.

In an embodiment, a degradation model and a degradation compensation function may be configured by a linear combination of a linear function. In another embodiment, a degradation model and a degradation compensation function may be configured with a quadratic function or a cubic function. In another embodiment, a degradation model and a degradation compensation function may be configured with an exponential function or a logarithmic function.

As described above, the RUL prediction process according to an embodiment of the present invention may largely reduce a prediction error through threshold time matching between pieces of multi-domain data and parameter value compensation based on a degradation model, and simultaneously, an RUL prediction diagnosis based on the second domain data may be more precisely performed.

First, according to the embodiments of the present invention, an anomaly diagnosis network model may be added to a health diagnosis system, and thus, an anomaly diagnosis, a health diagnosis, and an RUL diagnosis of a system may be simultaneously performed.

Second, an adversarial artificial neural network may be added to the health diagnosis system, and thus, the receptivity of multi-domain data may increase.

Third, based on an anomaly index value in each domain, the accuracy of prediction of an RUL may be enhanced through application of degradation compensation and matching between threshold times at which an abnormal state based on a domain is continued.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing health of a system by using a diagnosis model pre-learned based on multi-domain data including first and second domain data, the method comprising:
    calculating a reconstruction missing value with respect to the second domain data;
    determining a degree of degradation of the system on the basis of the reconstruction missing value;
    predicting a second remaining useful life (RUL) prediction value ŷ of the system on the basis of the second domain data, based on a result of the determination of the degree of degradation;
    optimizing a degradation compensation function on the basis of a distribution of a first RUL prediction value y of the system predicted based on the first domain data in a pre-learning process of the diagnosis model; and
    predicting a final RUL prediction value ŷ' obtained by compensating for the second RUL prediction value ŷ, by using the optimized degradation compensation function.

2. The method of claim 1, further comprising, before the calculating the reconstruction missing value, preprocessing the second domain data, wherein the preprocessing the second domain data comprises:
dividing a size of the second domain data into a batch size; and
connecting the second domain data divided into the batch size.

3. The method of claim 1, wherein the diagnosis model comprises an encoder network and a decoder network connected to an output of the encoder network, and
the calculating the reconstruction missing value comprises:
extracting a dimensionality-reduced second latent variable from the second domain data by using the encoder network;
reconstructing the second latent variable to have the same data dimensionality as a data dimensionality of the second domain data by using the decoder network; and
calculating the reconstruction missing value representing a difference between the second domain data and output data reconstructed from the second latent variable by using the decoder network.

4. The method of claim 3, wherein the encoder network is a neural network pre-learned not to classify the first and second domain data into different domains, and
the extracting the dimensionality-reduced second latent variable comprises extracting the second latent variable, including a common characteristic of the first and second domain data, from the second domain data by using the pre-learned encoder network.

5. The method of claim 1, wherein the determining the degree of degradation of the system comprises:
extracting an anomaly index on the basis of the reconstruction missing value;
comparing the anomaly index with a first threshold value to determine the occurrence or not of anomaly of the system; and
when it is determined that the anomaly of the system occurs, comparing a second threshold value with a ratio of the number of anomaly notification samples to the number of normalcy notification samples to determine the occurrence or not of anomaly associated with the degree of degradation of the system.

6. The method of claim 5, wherein the diagnosis model comprises an encoder network configured to extract a dimensionality-reduced second latent variable from the second domain data and a decoder network configured to reconstruct the second latent variable, and
the number of normalcy notification samples is the number of output values recognized as normalcy among output values of the decoder network, and the number of anomaly notification samples is the number of output values recognized as anomaly among the output values of the decoder network.

7. The method of claim 5, wherein the anomaly is a value obtained by normalizing the reconstruction missing value.

8. The method of claim 5, wherein the anomaly index is a representative value representing a maximum value, a minimum value, or an average value of the reconstruction missing value.

9. The method of claim 1, wherein the optimizing the degradation compensation function comprises mapping a second degradation model, representing a distribution of the second RUL prediction value $\hat{y}$, to a first degradation model representing a distribution of the first RUL prediction value $y$.

10. The method of claim 1, wherein the predicting the final RUL prediction value $\hat{y}'$ comprises:
calculating a first threshold time by using a first degradation model function representing a distribution of the first RUL prediction value $y$;
calculating a second threshold time by using a second degradation model function representing a distribution of the second RUL prediction value $\hat{y}$;
mapping the second threshold time to the first threshold time by using a difference time between the first threshold time and the second threshold time; and
outputting a compensated second RUL prediction value $\hat{y}'$ on the basis of the second threshold time mapped to the first threshold time.

* * * * *